United States Patent
Hogg

(10) Patent No.: US 7,349,344 B1
(45) Date of Patent: Mar. 25, 2008

(54) SYSTEM AND METHOD FOR PERFORMING SUBSCRIBER LOOP TESTING IN AN OPTICAL NETWORK

(75) Inventor: Raymond L. Hogg, Wylie, TX (US)

(73) Assignee: GenBand Inc., Austin, TX (US)

( * ) Notice: Subject to any disclaimer, the term of this patent is extended or adjusted under 35 U.S.C. 154(b) by 841 days.

(21) Appl. No.: 10/716,324

(22) Filed: Nov. 18, 2003

Related U.S. Application Data

(60) Provisional application No. 60/507,923, filed on Oct. 1, 2003.

(51) Int. Cl.
*H04L 12/26* (2006.01)
(52) U.S. Cl. ...................... 370/241; 370/247
(58) Field of Classification Search ............ 370/241, 370/242–253
See application file for complete search history.

(56) References Cited

U.S. PATENT DOCUMENTS

| | | | | |
|---|---|---|---|---|
| 5,301,050 A * | 4/1994 | Czerwiec et al. | ............ | 398/30 |
| 5,621,517 A * | 4/1997 | Jezwinski et al. | ......... | 356/73.1 |
| 6,014,369 A * | 1/2000 | Takahasahi | ............... | 370/248 |

OTHER PUBLICATIONS

Ray Hogg, "MLT? Support in Broadband Emulated Local Loop Environments", ATM Forum Technical Committee, pp. 1-19, Jan. 20-25, 2002.

Rajasekhar Aeparala, "CP-IWF MIB Addendum for MLT Support in Broadband Emulated Environments", ATM Forum Technical Committee, pp. 1-12, Jan. 20-25, 2002.

Ray Hogg, et al., "Automated Loop Testing Architectures", ATM Forum Technical Committee, pp. 1-23, Jan. 20-25, 2002.

"Integrated Digital Loop Carrier System Generic Requirements, Objectives, and Interface", Telcordia Technologies, 38 pages.

"Loop Emulation Service Using AAL2" Rev. 1, The ATM Forum Technical Committee, pp. 1-126, Feb. 2003.

"Loop Emulation Service Using AAL2 CP-IWF MIB Addendum", The ATM Forum Technical Committee, pp. 1-50, Oct. 2001.

* cited by examiner

*Primary Examiner*—Brenda Pham
(74) *Attorney, Agent, or Firm*—Baker Botts L.L.P.

(57) ABSTRACT

An access network includes a test system controller that provides a test request in Signaling Network Management Protocol (SNMP) messages to an element management system. A network gateway, in conjunction with the element management system, provides test commands to a customer gateway over a Local loop Emulation Service Embedded Operations Channel (LES-EOC). The customer gateway performs a subscriber loop test on derived subscriber lines connected therewith. Results of the subscriber loop test are provided over the LES-EOC to the gateway. The network gateway sends the results to the test system controller through the element management system in SNMP messages.

14 Claims, 1 Drawing Sheet

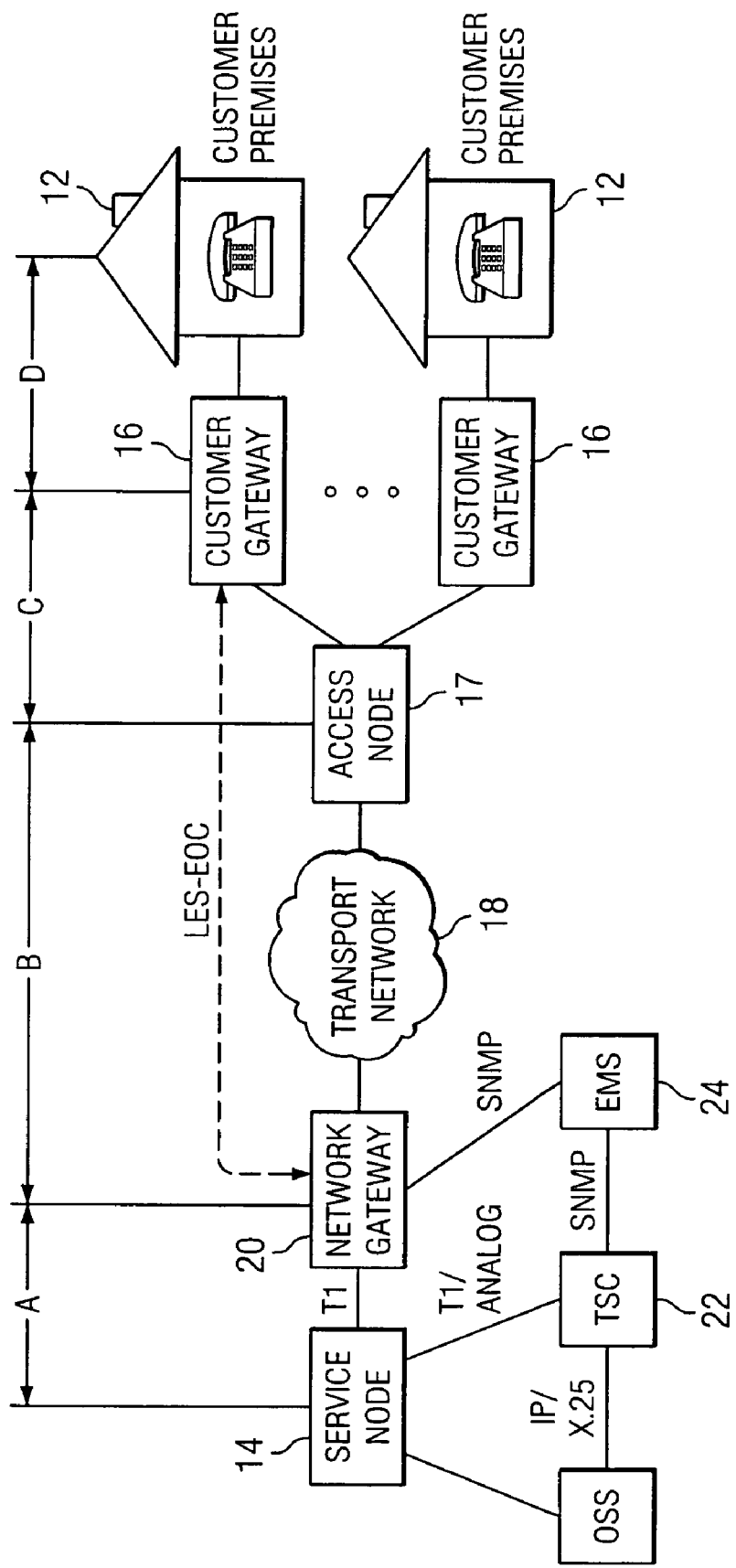

US 7,349,344 B1

SYSTEM AND METHOD FOR PERFORMING SUBSCRIBER LOOP TESTING IN AN OPTICAL NETWORK

RELATED APPLICATION

This application claims the benefit of U.S. Provisional Application Ser. No. 60/507,923 filed Oct. 1, 2003.

TECHNICAL FIELD OF THE INVENTION

The present invention relates in general to telecommunication network architectures and more particularly to a system and method for performing subscriber loop testing in an optical network.

BACKGROUND OF THE INVENTION

In packetized network architectures, the problem presented to a legacy metallic loop test system is that direct metallic access to a derived subscriber drop facility is not possible. As a result, other means are needed to support this type of architecture in terms of voice circuit testing and fault isolation.

SUMMARY OF THE INVENTION

From the foregoing, it may be appreciated by those skilled in the art that a need has arisen for performing subscriber loop testing in an optical network. In accordance with the present invention, a system and method for performing subscriber loop testing in an optical network are provided that substantially eliminate or greatly reduce disadvantages and problems of conventional telecommunications networks.

According to an embodiment of the present invention, there is provided a method for performing subscriber loop testing in an optical network that includes receiving a request to initiate a loop test. A customer gateway, to which test commands are to be sent, is identified and test commands are transmitted toward the identified customer gateway to perform a subscriber loop test. A channel test on an optical fiber link to the customer gateway is also performed. Results of the subscriber loop test are requested and then received. The results are provided from the channel test and the subscriber loop test to a test system controller. Signaling Network Management Protocol (SNMP) messages may be used to communicate requests and results.

The present invention provides various technical advantages over conventional telecommunications systems. For example, one technical advantage is to provide effective subscriber loop testing within an optical network. Another technical advantage is to eliminate a need for metallic bypass pairs in providing test results. Yet another technical advantage is to avoid transporting test requests and results through a Class 5 switch in the telecommunications network. Still another technical advantage is to control testing through a network gateway. Other technical advantages may be readily apparent to those skilled in the art from the following FIGURE, description, and claims.

BRIEF DESCRIPTION OF THE DRAWINGS

For a more complete understanding of the present invention and the advantages thereof, reference is now made to the following description, taken in conjunction with the accompanying drawings, wherein like reference numerals represent like parts, in which:

FIG. 1 illustrates a block diagram of an access network.

DETAILED DESCRIPTION OF THE INVENTION

FIG. 1 is a block diagram of an access network 10. Access network 10 may implement a broadband local loop emulation service (BLES) asynchronous transfer mode (ATM) passive optical network (PON) deployment model highlighting various network segments that provide an end to end access path between a derived subscriber 12 and a service node 14. Service node 14 may be a Class 5 local digital switch. Derived subscribers 12 have one or more information exchange capabilities at a customer premises or through a remote communication link. In access network 10, one or more customer gateways 16 are interconnected via an access node 17 and a transport network 18 to a network gateway 20 that provides service connectivity to one or more of service node 14. Customer gateways 16 may be optical network terminals and access node 17 may be an optical line terminal. Transport network 18 is shown providing an asynchronous transfer mode communication protocol but may equally use any other various communication protocols including Internet protocol and Frame Relay protocol in place thereof or in conjunction therewith. Testing of access network 10 is coordinated by a test system controller 22 in conjunction with an Element Management System (EMS) 24 upon a request from an Operations Support System (OSS) 26. There may be a conventional bypass pair connection between service node 14 and network gateway 20, but the bypass pair can be eliminated as the present invention does not require such connection.

Network gateway 20, customer gateway 16, access node 17, and any other intervening network element provide one or more distributed remote digital terminal functions that interface with a corresponding integrated digital terminal function within service node 14. Access network 10 includes one or more digital channels partitioned into separate test paths. Test path A is the time division multiplex transport segment between service node 14 and network gateway 20. Test path B is the asynchronous transfer mode transport segment between network gateway 20 and access node 17. Test path C is the optical fiber transport segment between access node 17 and customer gateway 16. Test path D is the metallic drop transport segment between customer gateway 16 and derived subscribers 12 that includes a derived line drop and in-house wiring to derived subscriber 12. A complete channel test path includes test paths A, B, and C. A derived channel test path includes test paths B and C.

In test path A, the time division multiplex transport segment of the complete end to end digital channel from service node 14 to customer gateway 16 is not expected to be a significant source of defects at the digital signal level zero (DS0) level and is to be detected in this architecture using alarm surveillance and performance monitoring techniques according to GR-303 specifications. Network gateway 20 provides continuous end to end fault monitoring with each customer gateway 16 to provide an equivalent channel test over the remaining packetized voice portion of the entire digital channel along the derived channel test path of test paths B and C. Network gateway 20 reports channel test failures if service-affecting faults are detected within the derived channel test path.

A metallic test head function in compliance with GR-909 specifications is integrated into customer gateway 16 to support testing and verification of the metallic drop facility for any derived subscriber line. The integrated metallic test head supports a subset of GR-909 metallic tests defined for short loops supporting LES plain old telephone service (POTS) circuits. The test strategy uses the defined faults in GR-909 specifications to convey summarized fault indications of the distributed derived voice access system as well as pass/fail results of the drop tests performed by the metallic test head in customer gateway 16.

The fiber to the user automated loop test involves EMS 24 and test system controller 22 correlating various faults detected within the distributed derived voice access system (such as network gateway 20, access node 17, and customer gateway 16 equipment failures or loss of end to end asynchronous transfer mode connectivity) and mapping these faults to VER codes consistent with GR-909 faults. The goal of the fiber to the user automated test architecture is to allow passive optical network (PON) derived voice lines to be treated identically to traditional POTS lines from the perspective of a repair service attendant interacting with test system controller 22. The desired input with which to initiate test operations is only the telephone number. Test system controller may include a database with all necessary information related to the telephone number or interact with service node 14 to obtain the needed information. Test system controller 22 associates telephone numbers with a given service node 14 in its database.

When a test request is received from OSS 26, test system controller 22 queries service node 14 via an input/output processor 28 and retrieves an originating equipment identifier to uniquely identify the service node 14 line associated with the telephone number. Using this information, test system controller 22 retrieves additional information from its database such as an indication that this is an ATM PON derived voice line, an element management system identifier, and a network gateway shelf identifier. With this information, test system controller 22 can direct Signaling Network Management Protocol (SNMP) messages toward customer gateway 16 through EMS 24 and network gateway 20. Test system controller 22 interacts with EMS 24 to resolve addressing for the derived voice line channel unit at customer gateway 16, determine that the digital transmission channel and LES-Embedded Operations Channel (EOC) management communication path from network gateway 20 to customer gateway 16 is fault free, and retrieve the equivalent channel test results from customer gateway 16. EMS 24 and network gateway 20 act as a transport for the SNMP message flow on the LES-EOC path for the Virtual Channel Connection (VCC) of customer gateway 16 supporting the derived line to be tested.

The equivalent channel test path is verified using a set of alternative test and fault monitoring operations conducted between network gateway 20 and customer gateway 16. The equivalent channel test may be initiated by test system controller 22 by a SNMP message ping to EMS 24 and network gateway 20 requesting retrieval of some system level parameters from customer gateway 16 in order to establish the functionality of the digital channel. If the SNMP message ping fails, an ATM Operations Administration and Maintenance (OAM) mechanism may also be employed. EMS 24 and network gateway 20 support F5 OAM loopbacks and continuity checks. Both segment and end to end loopbacks may be initiated as desired. Since access node 17 and customer gateway 16 both support F5 loopbacks, segment and end to end loopbacks may be used to sectionalize or determine whether the defect is in test path B or C.

Customer gateway 16 (upon command from network gateway 20 or through a periodic self initiated equipment diagnostic test) performs localized versions of Subscriber Line Interface Circuit (SLIC) and Subscriber Line Access Circuit (SLAC) diagnostic tests that include classic metallic loop voice frequency transmission tests such as two way channel loss, return loss, and idle channel noise. Also included are single party POTS signaling tests such as on/off hook and ringing. Customer gateway aggregates the results of these tests into a single pass/fail result that represents the assessment of equivalent channel testing for customer gateway 16. The pass/fail result is placed into an attribute of the LES-EOC SNMP message and made available to network gateway 20 and EMS 24 and eventually test system controller 22 at any time through a single SNMP GET message over the LES-EOC channel.

Voice grade metallic drop testing focuses on verifying the metallic loop facility extending beyond the analog line termination of access network 10. These tests are used to respond to subscriber trouble reports and to verify the need for repairs prior to service dispatch. The set of defined voice grade metallic test measurements is provided in GR-844 specifications. Due to the relatively short loop lengths involved in access network 10, a subset of the GR-844 tests are provided in GR-909 specifications. The voice grade metallic subscriber drop for access network 10 may only consist of in-house wiring. The applicable subset of voice grade metallic drop tests for derived voice lines served by the broadband PON of access network 10 includes a resistive faults test, a receiver off hook test, a ringers test, a hazardous potential test, and a foreign electromotive force test. The resistive faults test checks for dc resistive faults across tip/ring, tip/ground, and ring/ground lines. The receiver off hook test distinguishes a tip/ring resistive fault from an off hook condition. The ringers test determines the presence of appropriate ringer terminations on the subscriber's line. The hazardous potential test checks for the presence of excessively high levels of voltage on the drop that exceed pre-defined safety limits. The foreign electromotive force test checks for the presence of excessively high levels of voltage on the drop that do not necessarily exceed pre-defined safety limits.

When commanded by network gateway 20, customer gateway 16 runs the set of metallic tests on the designated derived voice line. Only one voice line can be tested on a single customer gateway 16 at a time. However, multiple tests may be run concurrently on different customer gateways 16. The test results are sent to network gateway 20 in an appropriate LES-EOC SNMP message where network gateway 20 and EMS 24 forwards the SNMP messages to test system controller 22 and may also translate the results into GR-303 EOC messages for forwarding to service node 14 and, if provided, signatures for forwarding onto the bypass pair.

Preferably, service node 14 is aware of what lines are under test so that it does not try to send communications on the line being tested. Moreover, service node 14 may initiate a channel test itself. When service node 14 initiates a channel test, network gateway 20 may be configured to emulate the channel test in order to provide service node 14 with appropriate responses. Network gateway 20 may re-route the channel test initiated by service node 14 to an internal processor or other internal testing element (such as a separate SLIC/SLAC) that can provide appropriate emulated responses to service node 14. At this time, network gateway 20 may initiate an equivalent channel test to customer gateway 16 and direct customer gateway 16 to run metallic drop tests on the line being tested by service node 14. In this manner, network gateway can provide responses for the equivalent channel test and the metallic drop test to service node 14 in response to its channel test. Network gateway 20 may alternatively provide emulated responses to service node 14 in responding to the channel test. As a result, network gateway 20 may be provisioned to provide a channel unit proxy function to emulate channel unit termination of test path A and facilitate a successful channel test functionality when directed by service node 14 instead of test system controller 22.

In summary, a network gateway provides for subscriber loop testing in an optical network in conjunction with a test system controller and an element management system. In this architecture, test results can be provided to the test system controller without being transported through a Class 5 switch. Also, the traditional metallic bypass pair at the Class 5 switch can be eliminated. An automated loop testing solution for derived subscriber lines in a packetized voice emulated loop optical network environment is provided that meets all of the requirements to seamlessly integrate into a service provider's legacy metallic loop test implementation and existing OSS procedures for standard POTS lines. This capability can also be provided for derived lines served from any integrated access device and/or media gateway regardless of whether it supports embedded metallic test head capability or other loop test support features. Though focusing on a voice over ATM access network scenario, the present invention may employ similar Internet Protocol (IP) and Internet Control Message Protocol functions for accomplishing the same purpose in a voice over IP access network scenario.

Thus, it is apparent that there has been provided, in accordance with the present invention, a system and method for performing subscriber loop testing in an optical network that satisfies the advantages set forth above. Although the present invention has been described in detail, it should be understood that various changes, substitutions, and alterations may be readily ascertainable by those skilled in the art and may be made herein without departing from the spirit and scope of the present invention as defined in the following claims. Moreover, the present invention is not intended to be limited in any way by any statement made herein that is not otherwise reflected in the following claims.

What is claimed is:

1. A method for performing subscriber loop testing in an optical network, comprising:
   receiving a request to initiate a loop test;
   identifying a customer gateway to which test commands are to be sent;
   transmitting test commands toward the identified customer gateway to perform a subscriber loop test;
   performing a channel test on an optical fiber link to the customer gateway;
   requesting results of the subscriber loop test;
   receiving the results of the subscriber loop test;
   providing results from the channel test and the subscriber loop test to a test system controller.

2. The method of claim 1, wherein the request is received through Signaling Network Management Protocol (SNMP) messages.

3. The method of claim 2, further comprising:
   converting the request into test commands;
   placing the test commands in SNMP messages;
   transmitting the SNMP messages containing the test commands to the customer gateway over a Local loop Emulation Service Embedded Operations Channel (LES-EOC).

4. The method of claim 2, wherein the results are provided through SNMP messages.

5. The method of claim 4, further comprising:
   receiving the results of the subscriber loop test over a Local loop Emulation Service Embedded Operations Channel (LES-EOC);
   converting the results of the subscriber loop test into SNMP messages.

6. The method of claim 1, wherein test commands are transmitted to the customer gateway over a Local loop Emulation Service Embedded Operations Channel (LES-EOC) path.

7. The method of claim 6, wherein the results of the subscriber loop test are received over the LES-EOC path.

8. A system for performing subscriber loop testing in an optical network, comprising:
   means for receiving a request to initiate a loop test;
   means for identifying a customer gateway to which test commands are to be sent;
   means for transmitting test commands toward the identified customer gateway to perform a subscriber loop test;
   means for performing a channel test on an optical fiber link to the customer gateway;
   means for requesting results of the subscriber loop test;
   means for receiving the results of the subscriber loop test;
   means for providing results from the channel test and the subscriber loop test to a test system controller.

9. The system of claim 8, wherein the request is received through Signaling Network Management Protocol (SNMP) messages.

10. The system of claim 9, further comprising:
    means for converting the request into test commands;
    means for placing the test commands in SNMP messages;
    means for transmitting the SNMP messages containing the test commands to the customer gateway over a Local loop Emulation Service Embedded Operations Channel (LES-EOC).

11. The system of claim 9, wherein the results are provided through SNMP messages.

12. The system of claim 11, further comprising:
    receiving the results of the subscriber loop test over a Local loop Emulation Service Embedded Operations Channel (LES-EOC);
    converting the results of the subscriber loop test into SNMP messages.

13. The system of claim 8, wherein test commands are transmitted to the customer gateway over a Local loop Emulation Service Embedded Operations Channel (LES-EOC) path.

14. The system of claim 13, wherein the results of the subscriber loop test are received over the LES-EOC path.

* * * * *